United States Patent [19]

Gasparetto

[11] Patent Number: 4,864,466
[45] Date of Patent: Sep. 5, 1989

[54] ARC-PROOF SHIELD FOR SWITCH GEAR COMPARTMENT

[75] Inventor: Mario G. Gasparetto, Toronto, Canada

[73] Assignee: BBC Brown Boveri Canada, Inc., Mississauga, Ontario, Canada

[21] Appl. No.: 212,207

[22] Filed: Jun. 27, 1988

[51] Int. Cl.⁴ .......................... H02B 5/00; E05C 7/00
[52] U.S. Cl. ..................................... 361/335; 200/304; 292/46; 312/215
[58] Field of Search ............... 361/335, 343, 344, 345; 200/43.16, 43.22, 50 A, 304; 312/215, 222, 216, 217; 292/27, 29, 46, 52, 124, 126; 220/324

[56] References Cited
U.S. PATENT DOCUMENTS

| | | | |
|---|---|---|---|
| 998,642 | 7/1911 | Shean | 292/25 X |
| 2,333,547 | 11/1943 | Neumann | 220/46 |
| 2,772,450 | 12/1956 | Stewart | 20/53 |
| 2,801,768 | 8/1957 | Immel | 220/88 |
| 4,031,340 | 6/1977 | Pastorel | 200/50 A |
| 4,245,566 | 1/1981 | Shimansky et al. | 109/49.5 |

Primary Examiner—A. D. Pellinen
Assistant Examiner—David Osborn
Attorney, Agent, or Firm—Joseph Scafetta, Jr.

[57] ABSTRACT

An arc-proof shield for covering a rectangular switch gear compartment having slotted channels secured to the inner face of each side wall thereof; the shield comprises a metallic cover consisting of a rectangular panel and flanged. Flaps are mounted on three of the flanged walls, each flap having a swivel portion receivable in a slotted channel of the compartment. A pair of handles are mounted frontwardly of the panel, each having a portion traversing the panel and connected to a link member associated with the swivel portion of pair of flaps so that actuation of the handles causes the swivel portion of the flaps to move in and out of the slotted channels of the compartments.

6 Claims, 2 Drawing Sheets

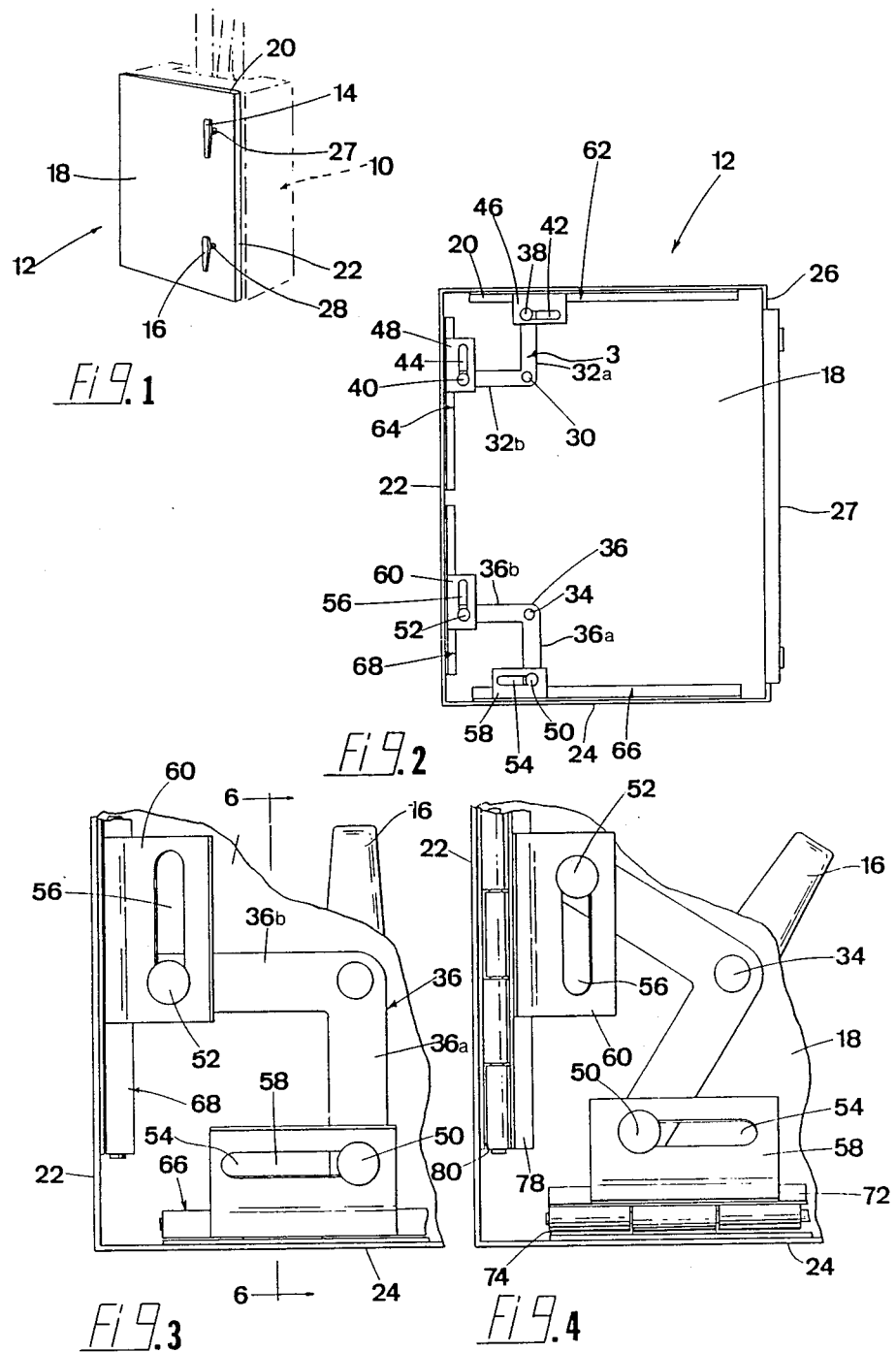

ARC-PROOF SHIELD FOR SWITCH GEAR COMPARTMENT

FIELD OF THE INVENTION

The present invention relates to an arc proof shield for covering a switch gear compartment.

BACKGROUND OF THE INVENTION

Electric arcs can occur inside voltage switch gears as a result of insulation failure or human error. The pressure from an electric arc is developed from two sources: the expansion of the metal in boiling, and the heating of the air by passage of the arc therethrough. Copper expands by an important factor (67000 times) in vaporizing. This accounts for the expulsion of near-vaporized droplets of molten metal from the arc; these droplets can be propelled for important distances (up to 10 feet). The pressure also generates plasma outward from the arc for distances proportional of the arc power. One cubic inch of copper vaporizes into 1.44 cubic yards of vapor. The air in the arc stream expands in warming up from its ambient temperature to that of the arc (about 35000° F).

Therefore, the arc can cause flash burns to the nearby personnel, or falls and collisions if and when they propelled by the pressure developed by the arc.

Another consequence of arcs in switchgears is structural damage to nearby equipment or walls.

Previous methods of protection used multi-point latch systems in arc-proof doors. These systems utilize captive panel screws to bolt the door to the frame on both vertical sides and top. Some systems also use hooks on the door and pins on the frame.

OBJECTS AND STATEMENT OF THE INVENTION

It is an object of the present invention to provide a safe and functional barrier between the places where the electrical arc can occur and the place where a person can be.

It is also an object of the present invention to provide an arc-proof door for a switch gear which is easy to manufacture and to operate.

The present invention is achieved by providing an arc-proof shield for covering a rectangular switch gear compartment having engaging means on the inner face of each side wall thereof, which comprises: a metallic cover consisting of a rectangular panel and flanged walls formed integral therewith and extending entirely thereon, one of the flanged walls having a projection receivable in one of the engaging means; flap means mounted on the remaining flanged walls, each flap means having a swivel portion receivable in the remaining engaging means of the compartment; handle means mounted frontwardly of the panel and having a portion traversing the panel; and link means extending rearwardly of the panel connecting the portion of the handle means to the swivel portion of the flap means whereby actuation of the handle means causes the swivel portion of the flap means to move in and out of the remaining engaging means of the compartment.

In one preferred form of the invention, each flap means consists of a butt hinge having a first portion fixed to a flanged wall and a second portion defining the swivel portion.

In another form of the invention, the shield comprises four flap means including a first flap extending along the top edge of the panel, a second flap extending along the lower edge of the panel and third and fourth vertically spaced flaps extending along the side of the panel opposite to the side displaying the projection. The handle means consists of a pair of handles including a first handle connected to the first and third flaps and a second handle connected to the second and fourth flaps.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a perspective view of a switch gear compartment, shown in dotted lines, using an arc-proof shield made in accordance with the present invention;

FIG. 2 is a rear elevational view of the arc proof shield of FIG. 1;

FIG. 3 is an enlarged elevational view showing the lower left corner of the shield of FIG. 2, the shield being in locked position;

FIG. 4 is a view similar to FIG. 3 showing the position of the handle in the disengaged position;

DESCRIPTION OF PREFERRED EMBODIMENTS

Figure 5:
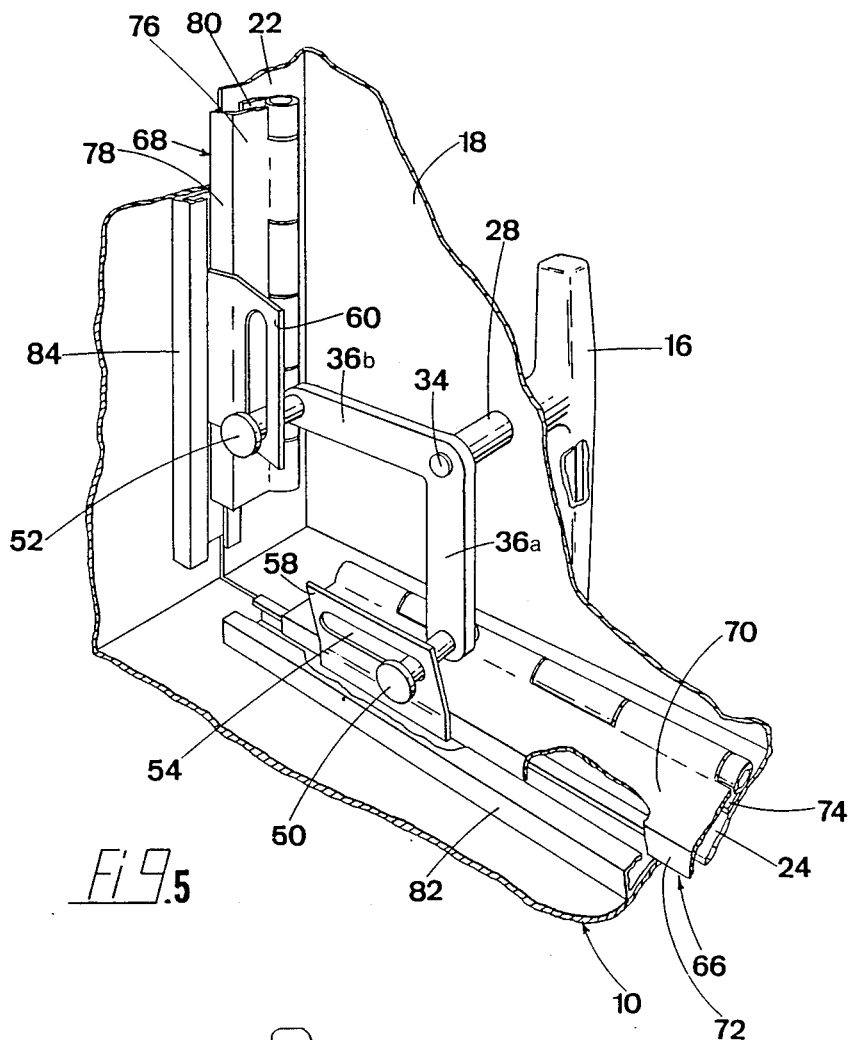
FIG. 5 is a perspective view showing sections of the compartment and its shield.

Referring to FIG. 1, there is shown a rectangular switch gear compartment 10 and a cover 12 displaying a pair of handles 14 and 16.

The cover 12 is made of metal (preferably 11 gage steel) and consists of a rectangular front panel 18 and four flanged walls 20, 22, 24 and 26 (see also FIG. 2) formed integral therewith and extending entirely therearound. Each handle has a portion 27, 28 which traverses the front panel 18 and has, at one end, a pin 30 to secure an L-shaped member 32 in the case of handle 14 and a pin 34 to secure an L-shaped member 36 in the case of handle 16.

Member 32 comprises a pair of arms 32a and 32b each displaying at its free end, a pin 38, 40 received in respective slots 42, 44 formed in a pair of plates 46 and 48.

Similarly, the L-shaped member 36 has a pair of arms 36a and 36b, each having at its free end, a pin 50, 52 adapted to slide in respective slots 54, 56 of plates 58 and 60.

Plates 46 and 48, 58 and 60 are respectively fixed to a series of flaps 62, 64, 66 and 68. Flap 62 extends along a portion of the upper flanged wall 20, while flap 66 extend along a portion of the lower flanged wall 24; flaps 64 and 68 are vertically spaced from one another and both secured to a portion of the flanged wall 22 of the door.

Figure 6:
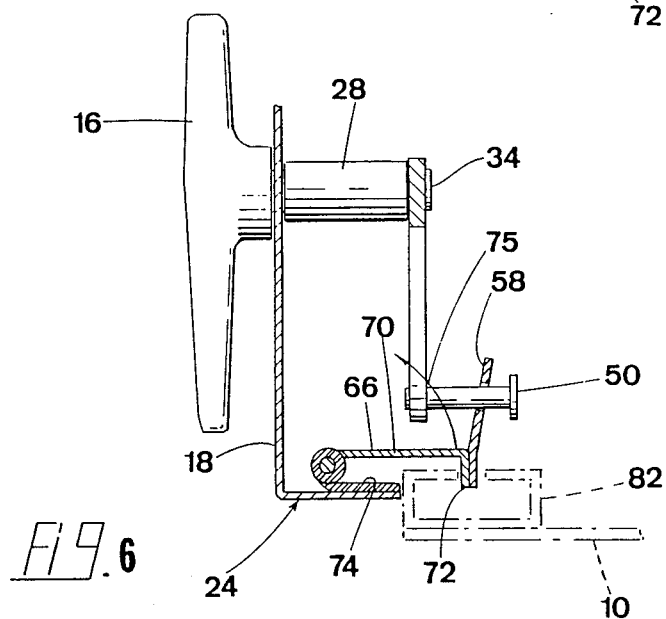
FIG. 6 a sectional view shown along lines 6—6 of FIG. 3.

Referring to FIGS. 5, and 6, a more detailed description of the construction and operation of the mechanism attached to a handle will now be given. Flap 66 consists of a butt hinge having a swivel portion 70 with a flanged end wall 72 and a fixed portion 74 secured to the inner face of the flanged wall 24. The lower end of plate 58 is fixedly secured, for example by soldering, to the flanged end 72 of the flap.

Similarly, flap 68 has a swivel portion 76 with a flanged end wall 78 and a fixed portion 80 secured to the inner face of flanged wall 22. The flanged end wall 78 has a portion fixedly secured to plate 60. The flanged end walls 72 and 78, together with their fixed portions of plates 58 and 60 are received in respective slotted channels 82, 84 in turn fixedly secured to the inner face of the rectangular compartment 10.

The construction of the flaps 62 and 64 of FIGS. 2 and their connection to plates 46 and 48 is identical to that just described for flaps 66 and 68 and their associated plates 58 and 60.

That portion of the plates 46, 48, 58 and 60 which does not contact a flanged end wall on flaps 62, 64, 66 and 68 defines an angle relative to that contacting portion. The function of this angle will now be described. With reference to FIG. 6, the rotation of handle 16 about pin 34 causes the pin 50 to rotate also and to slide in the slot 54 of the plate 58. By sliding in slot 54, pin 50 causes plate 58 to raise and the swivel portion 70 to rotate in the direction of arrow 75 to thereby free the end wall 72 and lower portion of plate 58 outside the slotted channel 82. The inclination of the upper portion of plate 58 will allow it to move also in the direction of arrow 75. The rotation terminates when the upper portion plate 58 adopts a substantially vertical position, in which case end walls 72 of the swivel portion is completely removed from slotted channel 82.

The rotation of the handle from an "in" to "out" position and vice versa is about 30°.

FIG. 4 represents the position of the handle 16 where the flanged end walls 72 and 78 of the swivel portions of flaps 66 and 68 are retracted from the slotted channels of the compartment. In that position, pins 50 and 52 have moved at the opposite end of slots 54, 56. In that position, plates 58 and 60 have their upper portions in a plane substantially parallel to the plane of the panel 18.

Hence, the rotation of handle 16 will cause the actuation of flaps 66 and 68 in and out of their slotted channels while the rotation of the handle 14 will cause the actuation of flaps 62 and 64 in and out of their respective slotted channels in the inner wall of the compartment.

Referring to FIG. 2, the flanged wall 26 has a portion 27 that is adapted to act as a hinge when inserted in a slotted channel mounted on the inner wall of the compartment.

Therefore, with the above construction the shield catches firmly the frame on all four sides and seals the gap to prevent fire and hot gases to escape from the switchgear whenever an arc accidentally occurs inside the compartment.

Although the invention has been described above with respect to a specific form, it will be evident to the person skilled in the art that it may be refined and modified in various ways. For example, there may be provided a transparent window in the door. Also, the length of the flaps may vary. It is therefore wished to have it understood that the present invention should not be limited in interpretation except by the terms of the following claims.

The embodiments of the invention in which an exclusive property or privilege is claimed are defined as follows:

1. An arc-proof shield covering a rectangular switch gear compartment having engaging means on the inner face of each side wall thereof, the arcproof shield comprising:

a metallic cover consisting of a rectangular panel and flanged walls formed integral therewith and extending entirely therearound; one of said flanged walls having a projection receivable in one of said engaging means;

flap means mounted on the remaining flanged walls, each flap means having at least one swivel portion receivable in the remaining engaging means of said compartment;

handle means mounted, frontwardly of said panel and having plural portions traversing said panel; and link means extending rearwardly of said panel connecting said plural portions of said handle means to said swivel portion of each of said flap means whereby actuation of said handle means causes said plural portions of rotate where the rotation of each portion causes are swivel portion on each of two flap means to move in and out of corresponding engaging means.

2. An arc-proof shield as defined in claim 1, wherein each said flap means consists of a butt hinge having a first portion fixed to said flanged wall and a second portion defining said swivel portion.

3. An arc-proof shield as defined in claim 2, wherein said swivel portion includes a plate having a longitudinal slot therethrough; said link means including one arm having one end connected to said portion of said handle means and pin means mounted at the other hand of said arm and cooperatingly received in said slot.

4. An arc-proof shield as defined in claim 3, wherein said swivel portion includes a flanged end receivable in said engaging means; said plate having a portion thereof fixedly connected to said flanged end of said swivel portion.

5. An arc-proof shield as defined in claim 1, comprising four flap means including a first flap extending along the top edge of the panel, a second flap extending along the lower edge of the panel and third and fourth vertically spaced flaps extending along a side of the panel opposite to the side displaying said projection; said handle means consisting of a pair of handles including a first handle connected to said first flap and said third flap and a second handle connected to said second flap and said fourth flap.

6. An arc-proof shield as defined in claim 5 wherein said link means consist of a pair of L-shaped members, a first of said L-shaped member connecting said first handle to said first and third flaps, the second L-shaped member connecting said second handle to said second and fourth flaps.

* * * * *